US012388759B2

(12) United States Patent
Xia et al.

(10) Patent No.: US 12,388,759 B2
(45) Date of Patent: Aug. 12, 2025

(54) NETWORK ACCESS CONTROL METHOD, SDF, CP, UP, AND NETWORK SYSTEM

(71) Applicant: Huawei Technologies Co., Ltd., Shenzhen (CN)

(72) Inventors: Xueting Xia, Nanjing (CN); Jianshu Shao, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 324 days.

(21) Appl. No.: 17/954,607

(22) Filed: Sep. 28, 2022

(65) Prior Publication Data
US 2023/0019667 A1 Jan. 19, 2023

Related U.S. Application Data

(63) Continuation of application No. PCT/CN2021/082904, filed on Mar. 25, 2021.

(30) Foreign Application Priority Data

Mar. 31, 2020 (CN) .......................... 202010247661.X

(51) Int. Cl.
H04L 47/2425 (2022.01)
H04L 47/125 (2022.01)

(52) U.S. Cl.
CPC ........ H04L 47/2425 (2013.01); H04L 47/125 (2013.01)

(58) Field of Classification Search
None
See application file for complete search history.

(56) References Cited

U.S. PATENT DOCUMENTS 8,289,968 B1 10/2012 Zhuang
10,230,664 B1 3/2019 Pushkarev et al.
(Continued)

FOREIGN PATENT DOCUMENTS

CN 105704042 A 6/2016
CN 106534376 A 3/2017
(Continued)

OTHER PUBLICATIONS

Hu, S. et al., "Simple Control and User Plane Separation Protocol (S-CUSP)," The China Mobile, Huawei, and ZTE BNG, draft-chz-simple-cu-separation-bng-protocol-06, Internet-Draft, Intended Status: Informational, ZTE, Oct. 19, 2019, 132 pages.

Primary Examiner — Mohamed Ibrahim
(74) Attorney, Agent, or Firm — Slater Matsil, LLP

(57) ABSTRACT

A network device having at least one processor and one or more non-transitory memories storing programming instructions that are associated with a steering decision function (SDF) in a network system and including instructions to obtain a carrier-grade network address translation (CGN) resource pool by receiving CGN resources reported by a plurality of user planes (UPs), where the network system includes the SDF, the plurality UPs, and a control plane (CP), receive a CGN instance obtaining request sent by the CP, the CGN instance obtaining request indicating to allocate a CGN instance to a user equipment, allocate a first CGN instance to the user equipment based on the CGN resource pool, the first CGN instance indicating a first UP, of the plurality of UPs, having an available CGN resource, and send the first CGN instance to the CP.

20 Claims, 5 Drawing Sheets

(56) References Cited

U.S. PATENT DOCUMENTS

| | | |
|---|---|---|
| 11,146,531 B2 | 10/2021 | Meng et al. |
| 2016/0072766 A1* | 3/2016 | Jain .................... H04L 61/2567 709/228 |
| 2018/0083876 A1* | 3/2018 | Sharma ............... H04L 45/7452 |
| 2020/0145278 A1* | 5/2020 | Ghadge ............... H04L 41/0668 |
| 2020/0162422 A1* | 5/2020 | Meng ................. H04L 61/2582 |

FOREIGN PATENT DOCUMENTS

| | | |
|---|---|---|
| CN | 106878117 A | 6/2017 |
| CN | 107547689 A | 1/2018 |
| CN | 108259632 A | 7/2018 |
| EP | 3614650 A1 | 2/2020 |

* cited by examiner

NETWORK ACCESS CONTROL METHOD, SDF, CP, UP, AND NETWORK SYSTEM

CROSS-REFERENCE TO RELATED APPLICATIONS

This application is a continuation of International Application No. PCT/CN2021/082904, filed on Mar. 25, 2021, which claims priority to Chinese Patent Application No. 202010247661.X, filed on Mar. 31, 2020. The disclosures of the aforementioned applications are hereby incorporated by reference in their entireties.

TECHNICAL FIELD

This application relates to the field of communication networks, and in particular, to a network access control method, a steering decision function (SDF), a control plane (CP), a user plane (UP), and a network system.

BACKGROUND

Software-defined networking (SDN) is a network architecture in which an SDN controller is introduced. The SDN controller controls a network device within a management scope (where the controlled network device is referred to as a forwarder), to implement forwarding-control separation and centralized control. To cope with access of a large quantity of user equipments, a plurality of UPs are configured for a broadband network gateway (BNG) in an SDN-based network architecture. When the user equipment goes online, one of the UPs is accessed to implement network access, and the accessed UP is used to bear traffic of the user equipment.

To implement load balancing management on the plurality of UPs, a traffic steering solution is currently introduced. In this solution, a steering decision function (SDF) is connected to or disposed in the SDN controller, and the SDF obtains a load status of each UP, selects a UP for newly connected user equipment based on a load balancing principle, and dynamically adjusts the user equipment to another UP based on reliability and a differentiated service-level agreement (SLA) after the user equipment accesses the network. This implements traffic optimization.

However, the traffic steering solution does not consider a problem of carrier-grade network address translation (carrier-grade NAT, CGN) resources, that is, when a UP is selected for user equipment, it cannot be ensured that the UP has an available CGN resource.

SUMMARY

Embodiments of this application provide a network access control method, an SDF, a CP, a UP, and a network system, to select a UP having a CGN resource during access of user equipment.

According to a first aspect, an embodiment of this application provides a network access control method, applied to a network system, where the network system includes a steering decision function SDF, a plurality of user planes UPs, and a control plane CP. The method includes the following.

The SDF receives CGN resources reported by the plurality of UPs, to obtain a CGN resource pool, where the CGN resources include a CGN service load status of each of the plurality of UPs. The SDF receives a CGN instance obtaining request sent by the CP, where the CGN instance obtaining request indicates to allocate a CGN instance to user equipment. The SDF allocates a first CGN instance to the user equipment based on the CGN resource pool, where the first CGN instance indicates a first UP having an available CGN resource, and the first UP is one of the plurality of UPs. The SDF sends the first CGN instance to the CP.

Therefore, the CP can enable, based on the first CGN instance, the first UP having the CGN resource to bear traffic of the user equipment and provide a CGN service for the user equipment. This ensures that a UP having an available CGN resource is allocated to the user equipment in a traffic steering scenario.

Optionally, in an implementation of the first aspect, the first CGN instance includes the first UP, a first CGN board in the first UP, and a first central processing unit CPU in the first CGN board, and the first CPU for implementing the CGN service is determined for the user equipment.

Optionally, in an implementation of the first aspect, the SDF receives a differentiated service-level agreement SLA policy configured by a remote authentication dial in user service radius server, and the SDF allocates the first CGN instance to the user equipment based on the CGN resource pool and the SLA policy, so that the allocated first CGN instance allocates the first UP having the available CGN resource to the user equipment and meets the SLA policy.

Optionally, in an implementation of the first aspect, the SDF receives a new SLA policy sent by the radius server. The SDF allocates a second CGN instance to the user equipment based on the new SLA policy and the CGN resource pool, where the second CGN instance indicates a second UP having an available CGN resource, and the second UP is one of the plurality of UPs. The SDF sends the second CGN instance to the CP. It is ensured that the second UP having the available CGN resource is allocated to the user equipment in a different SLA.

Optionally, in an implementation of the first aspect, the SDF determines that the first UP is faulty. The SDF allocates a third CGN instance to the user equipment based on the SLA policy and the CGN resource pool, where the third CGN instance indicates a third UP having an available CGN resource, and the third UP is one of the plurality of UPs. The SDF sends the third CGN instance to the CP. It is ensured that when the first UP bearing the user equipment is faulty, a UP having an available CGN resource is allocated to the user equipment.

According to a second aspect, an embodiment of this application provides a network access control method, applied to a network system, where the network system includes an SDF, a plurality of UPs, and a CP. The method includes the following.

The CP sends a CGN instance obtaining request to the SDF, where the CGN instance obtaining request indicates to allocate a CGN instance to user equipment. The CP receives a first CGN instance sent by the SDF, where the first CGN instance indicates a first UP having an available CGN resource, and the first UP is one of the plurality of UPs. The CP generates a first CGN steering policy based on the first CGN instance, where the first CGN steering policy indicates to steer traffic of the user equipment to the first UP indicated by the first CGN instance. The CP sends the first CGN steering policy to the first UP. In this embodiment of this application, the first CGN steering policy includes a traffic ACL rule, so that the first UP steers the traffic of the user equipment to a first CPU in a first CGN board according to the ACL rule.

Therefore, the first UP having the CGN resource bears the traffic of the user equipment and provides a CGN service for the user equipment. This ensures that a UP having an available CGN resource is allocated to the user equipment in a traffic steering scenario.

Optionally, in an implementation of the second aspect, the first CGN instance includes the first UP, a first CGN board in the first UP, and a first central processing unit CPU in the first CGN board, and the first CPU for implementing the CGN service is determined for the user equipment.

Optionally, in an implementation of the second aspect, the CP sends a user bearer indication message to the first UP, where the user bearer indication message indicates to bear the traffic of the user equipment. The CP receives a first public network address sent by the first UP, where the first public network address is a public network address allocated to the user equipment. The CP sends a source tracing log to a radius server, where the source tracing log includes a private network address of the user equipment and the first public network address. Therefore, when the user equipment accesses the first UP, an operator can monitor a network through the radius server.

Optionally, in an implementation of the second aspect, the CP receives a second CGN instance sent by the SDF, where the second CGN instance indicates a second UP having an available CGN resource, and the second UP is one of the plurality of UPs. The CP generates a second CGN steering policy based on the second CGN instance, where the second CGN steering policy indicates to steer the traffic of the user equipment to the second UP. The CP sends the second CGN steering policy to the second UP. It is ensured that in a UP switching scenario, the user equipment can still be allocated to the second UP having the available CGN resource.

Optionally, in an implementation of the second aspect, the CP sends the user bearer indication message to the second UP, where the user bearer indication message indicates to bear the traffic of the user equipment. The CP receives a second public network address sent by the second UP, where the second public network address is a public network address allocated to the user equipment by the second UP. The CP sends a source tracing log to the radius server, where the source tracing log includes the private network address of the user equipment and the second public network address. This ensures that in a UP switching scenario, a source tracing log can still be sent, so that an operator can monitor a network through the radius server.

Optionally, in an implementation of the second aspect, the CP receives a third CGN instance sent by the SDF, where the third CGN instance indicates a third UP having an available CGN resource, and the third UP is one of the plurality of UPs. The CP generates a third CGN steering policy based on the third CGN instance, where the third CGN steering policy indicates to steer the traffic of the user equipment to the third UP indicated by the third CGN instance. The CP sends the third CGN steering policy to the third UP. This ensures that in a scenario in which a UP is faulty, the user equipment can still be allocated to the third UP having the available CGN resource.

Optionally, in an implementation of the second aspect, the CP obtains the first public network address of the user equipment in the first UP. The CP sends the first public network address to the third UP, so that the third UP allocates the first public network address to the user equipment. The first public network address is a public network address of the user equipment in the first UP, and when the user equipment goes online, the CP has uploaded the first public network address and a private network address as a source tracing log to the radius server once. Therefore, the CP does not need to upload the source tracing log again, so that in a scenario in which the first UP is faulty, there is no need to upload large-scale source tracing logs, to save transmission resources and reduce network load.

Optionally, in an implementation of the second aspect, the CP obtains the first public network address of the user equipment in the first UP. The CP sends the first public network address to the third UP, so that the third UP allocates the first public network address to the user equipment.

According to a third aspect, an embodiment of this application provides a network access control method, applied to a network system, where the network system includes an SDF, a plurality of UPs, and a CP. The method includes the following.

A first UP reports a CGN resource to the SDF, where the CGN resource includes a CGN service load status of the first UP, and the first UP is one of the plurality of UPs. The first UP receives a first CGN steering policy sent by the CP, where the first CGN steering policy includes a first CGN instance, the first CGN instance indicates the first UP having an available CGN resource, and the first UP is one of the plurality of UPs. The first UP bears traffic of user equipment.

Therefore, the CP can enable, based on the first CGN instance, the first UP having the CGN resource to bear the traffic of the user equipment and provide a CGN service for the user equipment. This ensures that a UP having an available CGN resource is allocated to the user equipment in a traffic steering scenario.

Optionally, in an implementation of the third aspect, the first UP receives a user bearer indication message sent by the CP, where the user bearer indication message indicates to bear the traffic of the user equipment. The first UP allocates a first public network address to the user equipment. The first UP sends the first public network address to the CP. Therefore, an available public network address can be allocated to the user equipment when the user equipment goes online.

Optionally, in an implementation of the third aspect, the first UP receives a second public network address sent by the CP. The first UP allocates the second public network address to the user equipment. Therefore, when a fault occurs, the user equipment can keep an original public network address.

According to a fourth aspect, an embodiment of this application provides a network access control method, applied to a network system, where the network system includes an SDF, a plurality of UPs, and a CP. The method includes the following.

The plurality of UPs report CGN resources to the SDF, so that the SDF obtains a CGN resource pool, where the CGN resources include a CGN service load status of each of the plurality of UPs. The CP sends a CGN instance obtaining request to the SDF, where the CGN instance obtaining request indicates to allocate a CGN instance to user equipment. The SDF allocates a first CGN instance to the user equipment based on the CGN resource pool, where the first CGN instance indicates a first UP having an available CGN resource, and the first UP is one of the plurality of UPs. The SDF sends the first CGN instance to the CP. The CP generates a first CGN steering policy based on the first CGN instance, where the first CGN steering policy indicates to steer traffic of the user equipment to the first UP indicated by the first CGN instance. The CP sends the first CGN steering policy to the first UP. The first UP bears the traffic of the user equipment.

Therefore, the CP can enable, based on the first CGN instance, the first UP having the CGN resource to bear the traffic of the user equipment and provide a CGN service for the user equipment. This ensures that a UP having an available CGN resource is allocated to the user equipment in a traffic steering scenario.

According to a fifth aspect, an embodiment of this application provides a network device, applied to a network system, where the network system includes an SDF, a plurality of UPs, and a CP, the SDF is disposed in the network device, and the network device includes a transceiver module and a processing module.

The transceiver module is configured to receive CGN resources reported by the plurality of UPs, to obtain a CGN resource pool, where the CGN resources include a CGN service load status of each of the plurality of UPs. The transceiver module is further configured to receive a CGN instance obtaining request sent by the CP, where the CGN instance obtaining request indicates to allocate a CGN instance to user equipment. The processing module is configured to allocate a first CGN instance to the user equipment based on the CGN resource pool, where the first CGN instance indicates a first UP having an available CGN resource, and the first UP is one of the plurality of UPs. The transceiver module is further configured to send the first CGN instance to the CP.

Optionally, in an implementation of the fifth aspect, the transceiver module is further configured to receive a differentiated service-level agreement SLA policy configured by a remote authentication dial in user service radius server, and the processing module is specifically configured to allocate the first CGN instance to the user equipment based on the CGN resource pool and the SLA policy.

Optionally, in an implementation of the fifth aspect, the transceiver module is further configured to receive a new SLA policy sent by the radius server, the processing module is further configured to allocate a second CGN instance to the user equipment based on the new SLA policy and the CGN resource pool, where the second CGN instance indicates a second UP having an available CGN resource, and the second UP is one of the plurality of UPs, and the transceiver module is further configured to send the second CGN instance to the CP.

Optionally, in an implementation of the fifth aspect, the processing module is further configured to determine that the first UP is faulty, the processing module is further configured to allocate a third CGN instance to the user equipment based on the SLA policy and the CGN resource pool, where the third CGN instance indicates a third UP having an available CGN resource, and the third UP is one of the plurality of UPs, and the transceiver module is further configured to send the third CGN instance to the CP.

According to a sixth aspect, an embodiment of this application provides a CP, applied to a network system, where the network system includes an SDF, a plurality of UPs, and the CP, and the CP includes a transceiver module and a processing module. The transceiver module is configured to send a CGN instance obtaining request to the SDF, where the CGN instance obtaining request indicates to allocate a CGN instance to user equipment. The transceiver module is further configured to receive a first CGN instance sent by the SDF, where the first CGN instance indicates a first UP having an available CGN resource, and the first UP is one of the plurality of UPs. The processing module is further configured to generate a first CGN steering policy based on the first CGN instance, where the first CGN steering policy indicates to steer traffic of the user equipment to the first UP indicated by the first CGN instance. The transceiver module is further configured to send the first CGN steering policy to the first UP.

Optionally, in an implementation of the sixth aspect, the transceiver module is further configured to send a user bearer indication message to the first UP, where the user bearer indication message indicates to bear the traffic of the user equipment. The transceiver module is further configured to receive a first public network address sent by the first UP, where the first public network address is a public network address allocated to the user equipment. The transceiver module is further configured to send a source tracing log to a radius server, where the source tracing log includes a private network address of the user equipment and the first public network address.

Optionally, in an implementation of the sixth aspect, the transceiver module is further configured to receive a second CGN instance sent by the SDF, where the second CGN instance indicates a second UP having an available CGN resource, and the second UP is one of the plurality of UPs. The processing module is further configured to generate a second CGN steering policy based on the second CGN instance, where the second CGN steering policy indicates to steer the traffic of the user equipment to the second UP. The transceiver module is further configured to send the second CGN steering policy to the second UP.

Optionally, in an implementation of the sixth aspect, the transceiver module is further configured to send the user bearer indication message to the second UP, where the user bearer indication message indicates to bear the traffic of the user equipment. The transceiver module is further configured to receive a second public network address sent by the second UP, where the second public network address is a public network address allocated to the user equipment by the second UP. The transceiver module is further configured to send a source tracing log to the radius server, where the source tracing log includes the private network address of the user equipment and the second public network address.

Optionally, in an implementation of the sixth aspect, the transceiver module is further configured to receive a third CGN instance sent by the SDF, where the third CGN instance indicates a third UP having an available CGN resource, and the third UP is one of the plurality of UPs. The processing module is further configured to generate a third CGN steering policy based on the third CGN instance, where the third CGN steering policy indicates to steer the traffic of the user equipment to the third UP indicated by the third CGN instance. The transceiver module is further configured to send the third CGN steering policy to the third UP.

Optionally, in an implementation of the sixth aspect, the transceiver module is further configured to obtain the first public network address of the user equipment in the first UP, and the transceiver module is further configured to send the first public network address to the third UP, so that the third UP allocates the first public network address to the user equipment.

According to a seventh aspect, an embodiment of this application provides a UP, applied to a network system, where the network system includes an SDF, a plurality of UPs, and a CP, and the UP includes a transceiver module and a service module.

The transceiver module is configured to report a CGN resource to the SDF, where the CGN resource includes a CGN service load status of a first UP, and the first UP is one of the plurality of UPs. The transceiver module is further configured to receive a first CGN steering policy sent by the CP, where the first CGN steering policy includes a first CGN instance, the first CGN instance indicates the first UP having an available CGN resource, and the first UP is one of the plurality of UPs. The service module is configured to bear traffic of user equipment.

Optionally, in an implementation of the seventh aspect, the transceiver module is further configured to receive a user bearer indication message sent by the CP, where the user bearer indication message indicates to bear the traffic of the user equipment, the service module is configured to allocate a first public network address to the user equipment, and the transceiver module is further configured to send the first public network address to the CP.

Optionally, in an implementation of the seventh aspect, the transceiver module is further configured to receive a second public network address sent by the CP, and the service module is configured to allocate the second public network address to the user equipment.

According to an eighth aspect, an embodiment of this application provides a network system, including an SDF, a plurality of UPs, and a CP. The plurality of UPs are configured to report CGN resources to the SDF, so that the SDF obtains a CGN resource pool, where the CGN resources include a CGN service load status of each of the plurality of UPs. The CP is configured to send a CGN instance obtaining request to the SDF, where the CGN instance obtaining request indicates to allocate a CGN instance to user equipment. The SDF is configured to allocate a first CGN instance to the user equipment based on the CGN resource pool, where the first CGN instance indicates a first UP having an available CGN resource, and the first UP is one of the plurality of UPs, and send the first CGN instance to the CP. The CP is further configured to generate a first CGN steering policy based on the first CGN instance, where the first CGN steering policy indicates to steer traffic of the user equipment to the first UP indicated by the first CGN instance, and send the first CGN steering policy to the first UP. The first UP is configured to bear the traffic of the user equipment.

According to a ninth aspect, an embodiment of this application provides a computer-readable storage medium including instructions. When the instructions are run on a computer, the computer is enabled to perform the method provided in any one of the foregoing aspects.

According to a tenth aspect, an embodiment of this application provides a network device including a processor and a memory. The processor is coupled to the memory.

The memory is configured to store a program. The processor is configured to execute the program in the memory, so that a terminal device performs the method provided in any one of the foregoing aspects.

According to the foregoing technical solutions, it can be learned that embodiments of this application have the following advantages.

The plurality of UPs report the CGN resources to the SDF, so that the SDF obtains the CGN resource pool, where the CGN resources include the CGN service load status of each of the plurality of UPs. When the user equipment goes online, the CP sends the CGN instance obtaining request to the SDF, to allocate the CGN instance to the user equipment. The SDF allocates the first CGN instance to the user equipment based on the CGN resource pool. The first CGN instance indicates the first UP having the available CGN resource, and the first UP is one of the plurality of UPs. Finally, the SDF sends the first CGN instance to the CP. Therefore, the CP can enable, based on the first CGN instance, the first UP having the CGN resource to bear the traffic of the user equipment and provide the CGN service for the user equipment. This ensures that the UP having the available CGN resource is allocated to the user equipment in the traffic steering scenario.

DETAILED DESCRIPTION OF ILLUSTRATIVE EMBODIMENTS

Embodiments of this application provide a network access control method, a device, and a network system, to select a UP having a CGN resource for user equipment.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units that are not expressly listed or inherent to such a process, method, product, or device.

Figure 1:
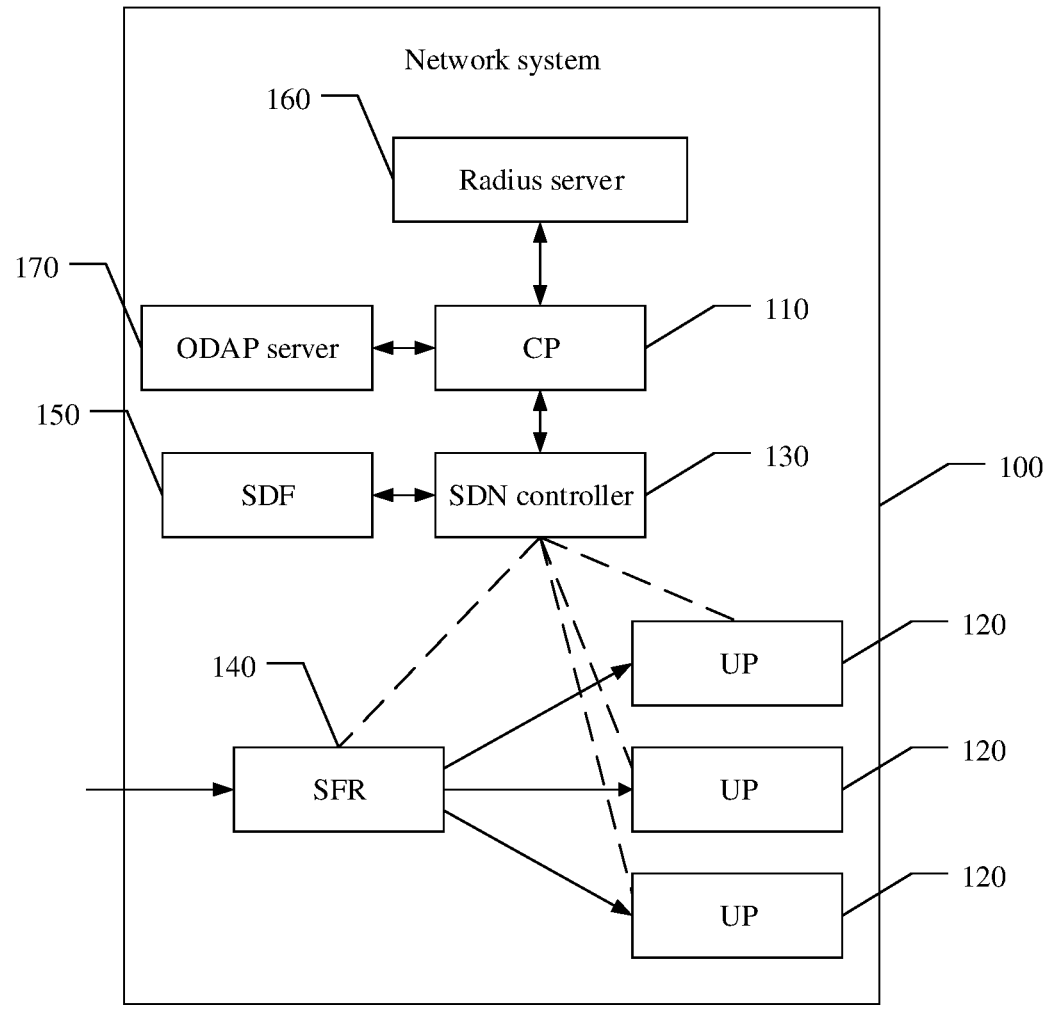
FIG. 1 is a schematic diagram of a structure of a network system to which an embodiment of this application is applied.

FIG. 1 shows a network system 100 to which an embodiment of this application is applied. The network system 100 includes a CP 110, a plurality of UPs 120, and an SDF 140. In some possible implementations, the network system 100 further includes an SDN controller 130, a steering function router (SFR) 150, a radius server 160, and an on-demand address pool (ODAP) server 170.

The SDN controller 130 is a core of an SDN technology-based network architecture. The SDN controller 130 has application programming interfaces (application program interfaces, APIs), and is connected to the CP 110 in a northbound direction and connected to the UP 120 in a southbound direction according to a northbound and southbound control plane and user plane separation protocol (for example, OpenFlow), to exchange control information between the CP 110 and the UP 120 and implement forwarding-control separation. In this embodiment of this application, the SDN controller 130 is connected to the SFR, the plurality of UPs 120, and the CP 110 through the API interfaces, to implement communication between the SFR, the plurality of UPs 120, and the CP 110.

In a forwarding-control separation scenario, the CP 110 is a control plane of a network device, for example, an network element management system (EMS), and is configured to implement centralized control on the plurality of UPs 120 through the SDN controller 130. The UP 120 is a user plane of the network device, is also referred to as a forwarder, and is configured to forward data according to routing instructions delivered by the CP 110 through the SDN controller 130.

The SDF 140 is a controller in a traffic steering solution, is connected to eastbound and westbound interfaces of the SDN controller 130, and is configured to uniformly manage UP 120 resources and CGN resources. In a scenario such as load balancing, the SDF 140 collects network load, calculates a balancing policy, and invokes a northbound interface of the SDN controller 130 to perform load adjustment on a Metro network. The CP 110 may dynamically select, by exchanging signaling with the SDF 140, a UP 120 through which a user goes online, and dynamically adjust the user to another UP 120 after the user goes online, to implement traffic optimization. In service scenarios such as an SLA scenario and a value-added service (VAS) scenario, the SDF 140 may further interact with the radius server 160 in a process in which the user goes online, calculate and generate a UP 120 meeting an SLA of the user, and notify the UP 120 to the CP 110. The SDF 140 may be implemented in a plurality of manners. The SDF 140 may be an independent network entity, and is usually developed by an operator. The SDF 140 delivers a control policy to the outside through the SDN controller 130. Alternatively, the SDF 140 may be a component of the SDN controller 130. It should be noted that, in the following embodiments, if the SDF 140 is an independent entity, the SDF 140 and the SDN controller 130 send information through a communication interface. If the SDF 140 is a component integrated into the SDN controller 130, the SDF 140 and the SDN controller 130 may exchange information inside the SDN controller 130.

In this embodiment of this application, the SFR 140 is used as user equipment, and steers traffic of the user equipment to an indicated UP 120 under control of the CP 110.

In this embodiment of this application, the radius server 160 is a server managed by the operator, and is configured to manage a source tracing log of the user equipment. The source tracing log is mapping between a private network address and a public network address of the user equipment.

The ODAP server 170 centrally manages address resources in a BNG forwarding-control separation architecture, and a public network address resource used by CGN for NAT is obtained through allocation of the ODAP server 170. The ODAP server 170 may be an independent network entity connected to the CP 110, or may be a component integrated into the CP 110. It should be noted that, in the following embodiments, if the ODAP server 170 is an independent entity, the ODAP server 170 and the CP 110 send information through a communication interface. If the ODAP server 170 is a component integrated into the CP 110, the ODAP server 170 and the CP 110 may exchange information inside the CP 110.

To cope with access of a large quantity of user equipments, a plurality of UPs 120 are configured for a BNG in an SDN-based network architecture. When the user equipment goes online, one of the UPs 120 is accessed to implement network access, and the accessed UP 120 is used to bear traffic of the user equipment.

To implement load balancing management on the plurality of UPs 120, a traffic steering solution is currently introduced. In this solution, the SDF 140 is connected to or disposed in the SDN controller 130, and the SDF 140 obtains a load status of each UP 120, selects a UP 120 for newly connected user equipment based on a load balancing principle, and dynamically adjusts the user equipment to another UP 120 based on reliability and an SLA after the user equipment accesses a network. This implements traffic optimization.

However, the traffic steering solution does not consider a problem of the CGN resources, that is, when a UP 120 is selected for user equipment, it cannot be ensured that the UP 120 has an available CGN resource.

Therefore, in this embodiment of this application, the SDF 140 receives CGN resources reported by the plurality of UPs 120, to obtain a CGN resource pool, where the CGN resources include a CGN service load status of each of the plurality of UPs 120. Then, the SDF 140 receives a user going-online message sent by the CP 110, where the user going-online message indicates that user equipment goes online. The SDF 140 allocates a first CGN instance to the user equipment based on the CGN resource pool and a configured SLA policy, where the first CGN instance includes a first UP 120, a first CGN board in the first UP 120, and a first CPU in the first CGN board, and the first UP 120 is one of the plurality of UPs 120. Finally, the SDF 140 sends the first CGN instance to the CP 110. This ensures that a UP 120 having an available CGN resource is allocated to the user equipment in a traffic steering scenario.

The following describes the technical solutions in embodiments of this application based on different application scenarios of user equipment going-online, switching, and migration.

Embodiment 1: User Equipment Going-Online

Figure 2:
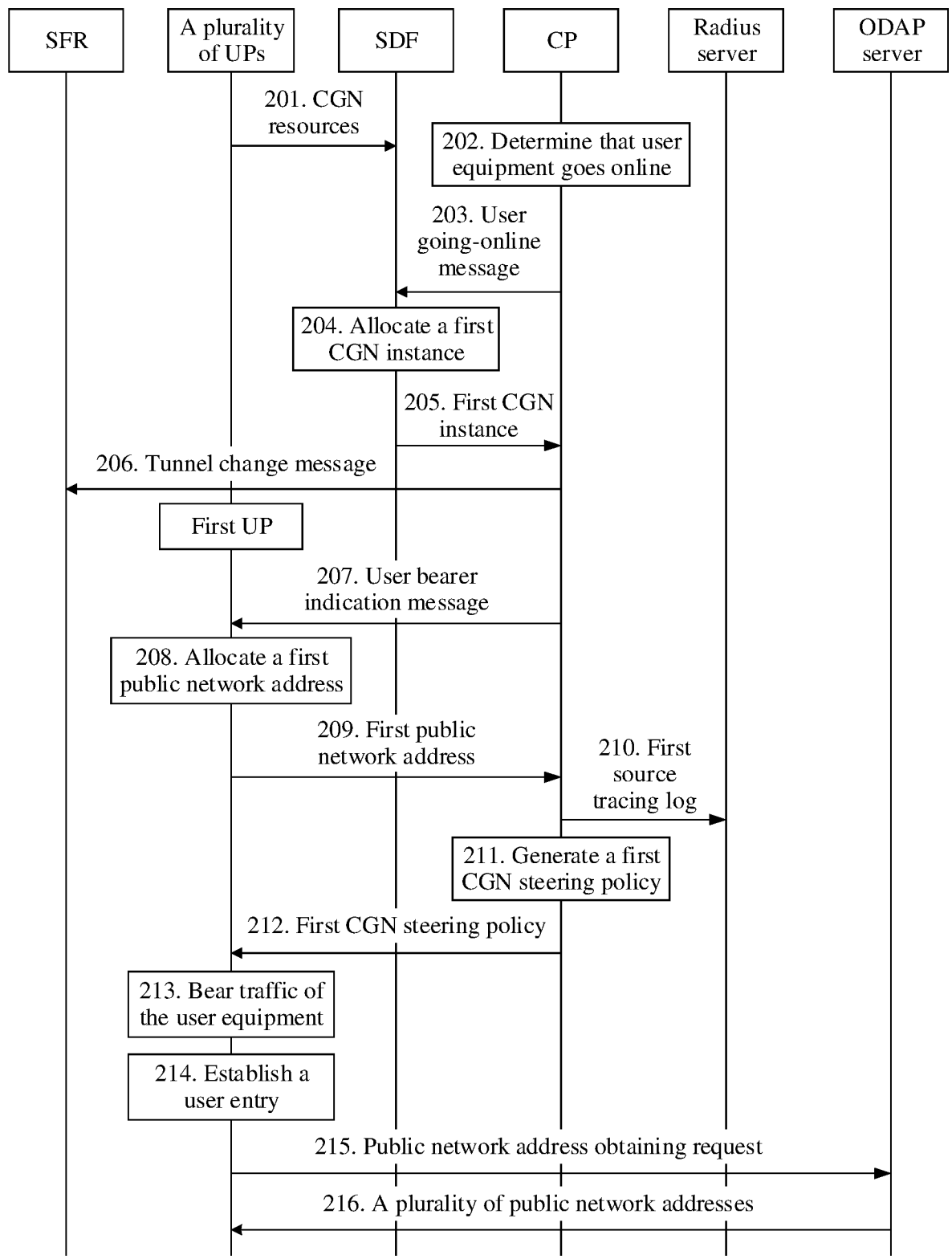
FIG. 2 is a schematic diagram of a network access control method according to an embodiment of this application.

Specifically, with reference to FIG. 2, this application provides a network access control method that includes the following steps.

201. A plurality of UPs report CGN resources to an SDF, so that the SDF obtains a CGN resource pool, where the CGN resources include a CGN service load status of each of the plurality of UPs.

When a UP goes online, the UP obtains, through signaling exchange between a CP and an ODAP server, a specific quantity of public network addresses, for example, 100 public network addresses. A UP includes a plurality of CGN boards, and a CGN board includes a plurality of CPUs. After the UP obtains public network addresses, the UP allocates the public network addresses to various CGN boards for management, and the CGN board allocates, to various CPUs for management, the public network addresses allocated to the CGN board. When user equipment accesses the UP, the UP allocates a CGN board and a CPU in the CGN board to the user equipment, and allocates one available public network address managed by the CPU to the user equipment, that is, provides a CGN service for the user equipment, so that the user equipment can access a public network by using the public network address.

For example, one UP has three CGN boards: a board 1, a board 2, and a board 3 respectively. The board 1 has three CPUs, the board 2 has six CPUs, and the board 3 has one CPU. That is, the UP has 14 CPUs in total. After the UP obtains 100 public network addresses, the UP allocates the 100 public network addresses to 10 CPUs. For example, the UP allocates 10 public network addresses to each CPU, or allocates five public network addresses to each of five CPUs, and 15 public network addresses to each of the other five CPUs. This is not limited herein.

When the UP provides the CGN service for the user equipment, a CGN resource needs to be used. For example, an available public network address, that is, at least one CPU in at least one CGN board in the UP needs to have an available public network address. Therefore, before the UP provides the CGN service for the user equipment, the UP needs to report a CGN resource of the UP.

In some possible implementations, the CGN resource includes address usage, session quantity usage, CPU usage, CPU bandwidth, and the like. Specifically, the address usage is a proportion of a quantity of used public network addresses to a quantity of allocated public network addresses. For example, if a UP has applied for 100 public network addresses and 80 public network addresses have been used, the address usage is 80:100=80%. For example, if a maximum quantity of sessions supported by the UP is 16 million and a quantity of currently used sessions is 8 million, the session usage is 50%. The CPU usage is a real-time CPU usage calculated based on a CPU processing capability. The CPU bandwidth is a data transmission rate between a CPU and a northbridge. In conclusion, the CGN resource is a CGN service load status of a UP, and reflects a capability of the UP for the CGN service.

It should be noted that the CGN resource is also dynamic. To be specific, after the UP serves one more user equipment, the CGN resource that can be provided by the UP is reduced. Therefore, the UP needs to dynamically or periodically report the CGN resource to the SDF. After receiving the CGN resources reported by the plurality of UPs, the SDF integrates the resources to obtain a CGN resource pool. When the user equipment goes online, the SDF may select a CGN instance based on the CGN resource pool, and allocate the CGN instance to the user equipment, to ensure that the UP accessed by the user equipment has an available CGN resource.

202. The CP determines that the user equipment goes online.

In this embodiment of this application, when the user equipment goes online, the user equipment may be connected to an SFR, and then the SFR allocates, based on a network plan, a UP, for example, a UP 1, to the user equipment to let the user equipment go online. When the user equipment goes online at the UP 1, the UP 1 performs signaling exchange with the CP, so that the CP determines that the user equipment goes online. A CGN resource may not be available to the UP 1 allocated according to a conventional network plan. Therefore, the CP needs to query the CGN resource pool on the SDF, and allocate a UP having an available CGN resource to the user equipment.

It should be noted that, when different user equipments go online, different UPs may be selected for online access according to the network plan. For example, when user equipment 1 goes online, a UP 2 is allocated according to the network plan. When user equipment 2 goes online, a UP 5 is allocated according to the network plan. When user equipment 3 goes online, the UP 2 is allocated according to the network plan. It should be noted that regardless of a selected UP, an accessed UP needs to perform signaling exchange with the CP, so that the CP determines that new user equipment goes online.

203. The CP sends a CGN instance obtaining request to the SDF, where the CGN instance obtaining request indicates to allocate a CGN instance to the user equipment.

In this embodiment of this application, after determining that the user equipment goes online, the CP queries the CGN resource pool on the SDF, to select a UP having a CGN resource. Specifically, the CP first sends the CGN instance obtaining request to the SDF, where the CGN instance obtaining request indicates to allocate the CGN instance to the user equipment.

204. The SDF allocates a first CGN instance to the user equipment based on the CGN resource pool, where the first CGN instance indicates a first UP having an available CGN resource, and the first UP is one of the plurality of UPs.

After the SDF receives the CGN instance obtaining request, the SDF may allocate the first CGN instance to the user equipment based on the CGN resource pool, where the first CGN instance indicates the first UP having the available CGN resource, and the first UP is one of the plurality of UPs. In some possible implementations, the SDF may preferentially determine whether a UP currently accessed by the user equipment has an available CGN resource. If the UP currently accessed by the user equipment has the available CGN resource, the SDF preferentially allocates a CGN instance in the UP to the user equipment, to reduce unnecessary signaling exchange in a switching process and reduce resource consumption.

In some possible implementations, the SDF may alternatively select, according to a load balancing principle, a UP, a CGN board, and a CPU with light load, and allocate the UP, the CGN board, and the CPU to the user equipment. Load statuses of different UPs, CGN boards, and CPUs may be measured based on factors such as the address usage, the CPU usage, bandwidth usage, and the session quantity usage.

The address usage is used as an example. It is assumed that there are three available UPs in a CGN resource pool: a UP 1, a UP 2, and a UP 3 respectively, and address usage of the UP 1, address usage of the UP 2, and address usage of the UP 3 are 80%, 70%, and 50% respectively. According to the load balancing principle, the UP 3 with the lightest load may be selected as a first UP. Then, according to the same principle, a CGN board with the lightest load is selected from the first UP as a first CGN board, and a first CPU with the lightest load is selected from the first CGN board. Therefore, a first CGN instance is determined.

In some possible implementations, remaining available public network addresses of each UP may alternatively be considered to select a UP with the largest quantity of available public network addresses, a CGN board with the largest quantity of available public network addresses in the UP, and a CPU with the largest quantity of available public network addresses in the CGN board.

In some possible implementations, a UP and a CGN board may be determined by using the foregoing method, and then when a CPU is selected, a CPU with low CPU usage is selected as a first CPU from various CPUs having available public network addresses. In some possible implementations, session quantity usage, CPU bandwidth, and the like of each CPU may alternatively be considered. This is not limited herein.

In some possible implementations, weighting may alternatively be performed based on a comprehensive consideration on the foregoing plurality of factors, to select a proper CGN instance and allocate the CGN instance to the user equipment. This is not limited herein.

In some possible implementations, before the SDF allocates the first CGN instance to the user equipment based on the CGN resource pool, the SDF receives a differentiated service-level agreement SLA policy configured by a radius server, and then the SDF allocates the first CGN instance to the user equipment based on the CGN resource pool and the SLA policy. It should be noted that the SLA policy is configured by the radius server, and is dynamically delivered to the SDF. The SLA policy is a contract or an agreement signed by a service provider and a user, and the contract regulates a business relationship or a part of the business relationship between the two parties.

205. The SDF sends the first CGN instance to the CP.

In this embodiment of this application, after determining the first CGN instance allocated to the user equipment, the SDF may send the first CGN instance to the CP, to complete a process in which the CP queries the CGN resource pool on the SDF to determine the first CGN instance. In this embodiment of this application, because the SDF selects, based on the CGN resource pool, the UP having the CGN resource, when the user equipment accesses the UP indicated by the first CGN instance, it is ensured that there is an available CGN resource.

206. The CP delivers a tunnel change message to the SFR, where the tunnel change message indicates the SFR to steer traffic of the user equipment to the first UP.

After determining the first CGN instance, the CP delivers the tunnel change message to the SFR, so that the SFR steers the traffic of the user equipment to the first UP indicated by the first CGN, and enables the first UP to bear the traffic of the user equipment. For example, the traffic of the user equipment in the SFR is sent to the UP 1 according to an original network plan. Now, after a new UP is determined, for example, the UP 2 is determined as the first UP, the SFR forwards, to the UP 2, all newly received traffic sent by the user equipment, and enables the UP 2 to bear the traffic of the user equipment. In some possible implementations, if a new UP determined by the SDF is the same as the UP that originally bears the traffic of the user equipment, the tunnel change message may not need to be delivered to the SFR. This is not limited herein.

207. The CP sends a user bearer indication message to the first UP, where the user bearer indication message indicates to bear the traffic of the user equipment.

In this embodiment of this application, after obtaining the first CGN instance from the SDF, the CP determines the first UP based on the first CGN instance, and may send the user bearer indication message to the first UP. The user bearer indication message indicates to bear the traffic of the user equipment. The first UP may bear the traffic of the user equipment after receiving the user bearer indication message. In this case, the SFR determines to forward the traffic of the user equipment to the first UP, and the first UP also determines to receive the traffic of the user equipment. In this way, the traffic of the user equipment is switched from an originally accessed UP to the first UP.

208. The first UP allocates a first public network address to the user equipment.

In this embodiment of this application, the user bearer indication message further includes the first CGN instance, to indicate the first UP to allocate a public network address to the user equipment based on the first CPU in the first CGN board indicated by the first CGN instance. In this case, the first UP selects the first public network address from a plurality of managed public network addresses based on an indication in the user bearer indication message through the first CGN board in the first CGN instance and the first CPU, and allocates the first public network address to the user equipment.

209. The first UP sends the first public network address to the CP.

In this embodiment of this application, after allocating the first public network address to the user equipment, the first UP may send the first public network address to the CP, that is, indicate to the CP that the first UP translates a private network address of the user equipment into the first public network address. In this case, the user equipment may access the network by using the first public network address.

210. The CP sends a first source tracing log to the radius server, where the first source tracing log includes the private network address of the user equipment and the first public network address.

When receiving the first public network address, the CP may send a source tracing log to the radius server, where the source tracing log includes the private network address of the user equipment and the first public network address. It should be noted that an operator maintains a network by using the source tracing log on the radius server, for example, performs authentication, authorization, and accounting.

211. The CP generates a first CGN steering policy based on the first CGN instance, where the first CGN steering policy indicates to steer the traffic of the user equipment to the first UP indicated by the first CGN instance.

After determining the first CGN instance, the CP needs to send the first CGN steering policy to the first UP indicated by the first CGN instance, where the first CGN steering policy indicates to steer the traffic of the user equipment to the first UP indicated by the first CGN instance. In this embodiment of this application, the first CGN steering policy includes a access control list traffic (ACL) rule, so that the first UP steers the traffic of the user equipment to the first CPU in the first CGN board according to the ACL rule.

For example, on the first UP, the first CGN, and the first CPU, a condition in the traffic ACL rule is IP address=the private network address of the user equipment. If the condition is met, permission (permit) is performed. If the condition is not met, denial (deny) is performed. In this case, the traffic of the user equipment is steered to the first UP, the first CGN, and the first CPU.

212. The CP sends the first CGN steering policy to the first UP.

After the first CGN steering policy is determined, the first CGN steering policy may be sent to the first UP, so that the first UP may bear the traffic of the user equipment based on an indication of the first CGN steering policy.

213. The first UP bears the traffic of the user equipment.

In this embodiment of this application, after the first UP receives the first CGN steering policy and performs setting according to the traffic ACL rule in the first CGN steering policy, the first UP may provide the CGN service for the user equipment, that is, bear the traffic of the user equipment, and translate the private network address of the user equipment into the first public network address, to implement access of the user equipment to the network. It should be noted that, after the first UP bears the traffic of the user equipment, the first CPU in the first CGN board in the first UP needs to use a CGN resource to provide the CGN service for the user equipment. Therefore, load on the first UP, the first CGN board, and the first CPU becomes heavier, and a load status is changed. In this case, the first UP may report a new CGN resource to the SDF, or report a load status of a new CGN resource to the SDF at a predetermined time point.

214. The first UP establishes a user entry for the user equipment.

In some possible implementations, when providing a service for the user equipment, the first UP may establish the user entry for the user equipment, that is, add an entry to an original user table, to record information about the user equipment, for example, the private network address of the user equipment, the first public network address, and the first CGN instance. This is not limited herein.

215. The first UP sends a public network address obtaining request to the ODAP through the CP.

In some possible implementations, if available public network addresses of the first UP are insufficient, for example, a quantity of the available public network addresses is less than a preset value, the first UP needs to further apply for some public network addresses for further use. For example, a preset value is 80%. 100 public network addresses are originally allocated to the first UP, and 79 public network addresses have been currently used. After one public network address is allocated to the user equipment, a quantity of used public network addresses reaches 80. Therefore, address usage reaches 80%, triggering the first UP to apply to the ODAP for more public network addresses.

Specifically, the first UP sends the public network address obtaining request to the CP, and the CP forwards the public network address obtaining request to the ODAP server. Then, the ODAP server sends a plurality of public network addresses, for example, 100 public network addresses, to the CP based on requested content.

216. The ODAP server sends the plurality of public network addresses to the first UP through the CP.

After the CP obtains the plurality of public network addresses returned by the ODAP, the CP forwards the plurality of public network addresses to the first UP. Then, the first UP allocates the obtained public network addresses to the plurality of CGN boards and each CPU in each CGN board for management.

Embodiment 2: User Equipment Switching

Figure 3:
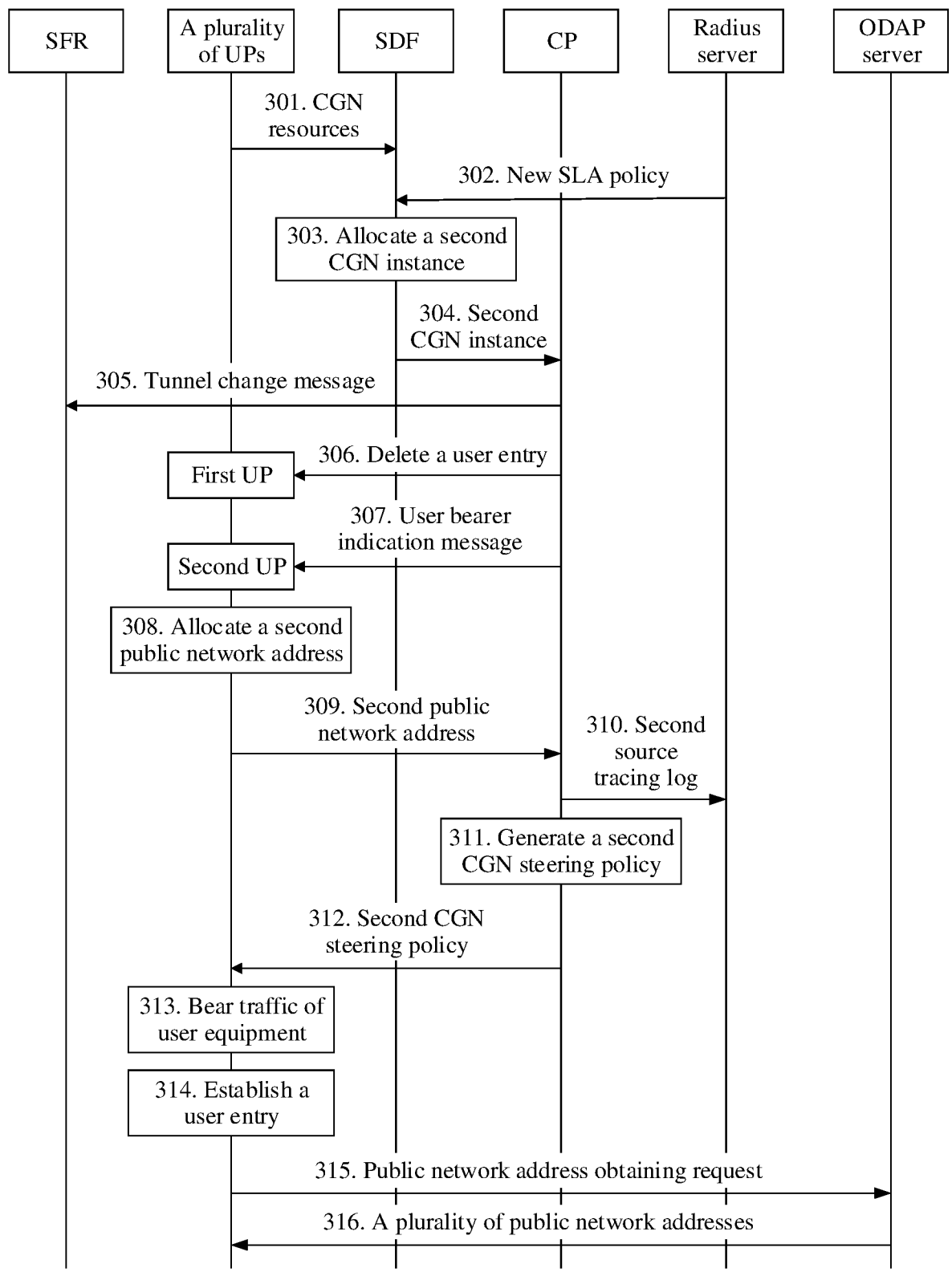
FIG. 3 is a schematic diagram of a network access control method according to an embodiment of this application.

Specifically, with reference to FIG. 3, this application provides a network access control method that includes the following steps.

301. A plurality of UPs report CGN resources to an SDF, so that the SDF obtains a CGN resource pool, where the CGN resources include a CGN service load status of each of the plurality of UPs.

Step 301 is the same as step 201, and details are not described herein again.

302. A radius server sends a new SLA policy to the SDF.

In this embodiment of this application, an SLA policy is dynamically configured. Therefore, after changing the SLA policy, the radius server sends the new SLA policy to the SDF, so that the SDF allocates a second CGN instance to user equipment based on the new SLA policy and the CGN resource pool.

303. The SDF allocates the second CGN instance to the user equipment based on the new SLA policy and the CGN resource pool. The second CGN instance includes a second UP, a second CGN board in the second UP, and a second CPU in the second CGN board, and the second UP is one of the plurality of UPs.

Step 303 is similar to step 204, and details are not described herein again.

304. The SDF sends the second CGN instance to a CP.

Step 304 is similar to step 205, and details are not described herein again.

305. The CP delivers a tunnel change message to an SFR, where the tunnel change message indicates the SFR to steer traffic of the user equipment to the second UP.

Step 305 is similar to step 206, and details are not described herein again.

306. The CP deletes a user entry for the user equipment in a first UP.

In this embodiment of this application, when the CP determines to switch the user equipment to the second UP, the CP needs to first delete the user entry for the user equipment in the first UP, and release a first public network address, so that the first public network address is reused as an available public network address. When the first UP serves another user equipment, the first public network address may be used.

307. The CP sends a user bearer indication message to the second UP, where the user bearer indication message indicates to bear the traffic of the user equipment.

Step 307 is similar to step 207, and details are not described herein again.

308. The second UP allocates a second public network address to the user equipment.

Step 308 is similar to step 208, and details are not described herein again.

309. The second UP sends the second public network address to the CP.

Step 308 is similar to step 208, and details are not described herein again.

310. The CP sends a second source tracing log to the radius server, where the second source tracing log includes a private network address of the user equipment and the second public network address.

Step 309 is similar to step 209, and details are not described herein again.

311. The CP generates a second CGN steering policy based on the second CGN instance, where the second CGN steering policy indicates to steer the traffic of the user equipment to the second UP.

Step 310 is similar to step 210, and details are not described herein again.

312. The CP sends the second CGN steering policy to the second UP.

Step 311 is similar to step 211, and details are not described herein again.

313. The second UP bears the traffic of the user equipment through the second CPU.

Step 312 is similar to step 212, and details are not described herein again.

314. The second UP establishes a user entry for the user equipment.

Step 313 is similar to step 213, and details are not described herein again.

315. The second UP sends a public network address obtaining request to an ODAP through the CP.

Step 314 is similar to step 214, and details are not described herein again.

316. The ODAP server sends a plurality of public network addresses to the second UP through the CP.

Step 315 is similar to step 215, and details are not described herein again.

It should be noted that, if the UP, the CGN board, and the CPU indicated by the second CGN instance are the same as those indicated by the first CGN instance, the foregoing steps 304 to 313 may not need to be performed, or may be performed again. This is not limited herein. If the UP, the CGN board, and the CPU indicated by the second CGN instance are different from those indicated by the first CGN instance, the user equipment is switched from the first UP to the second UP.

Embodiment 3: User Equipment Migration

Figure 4:
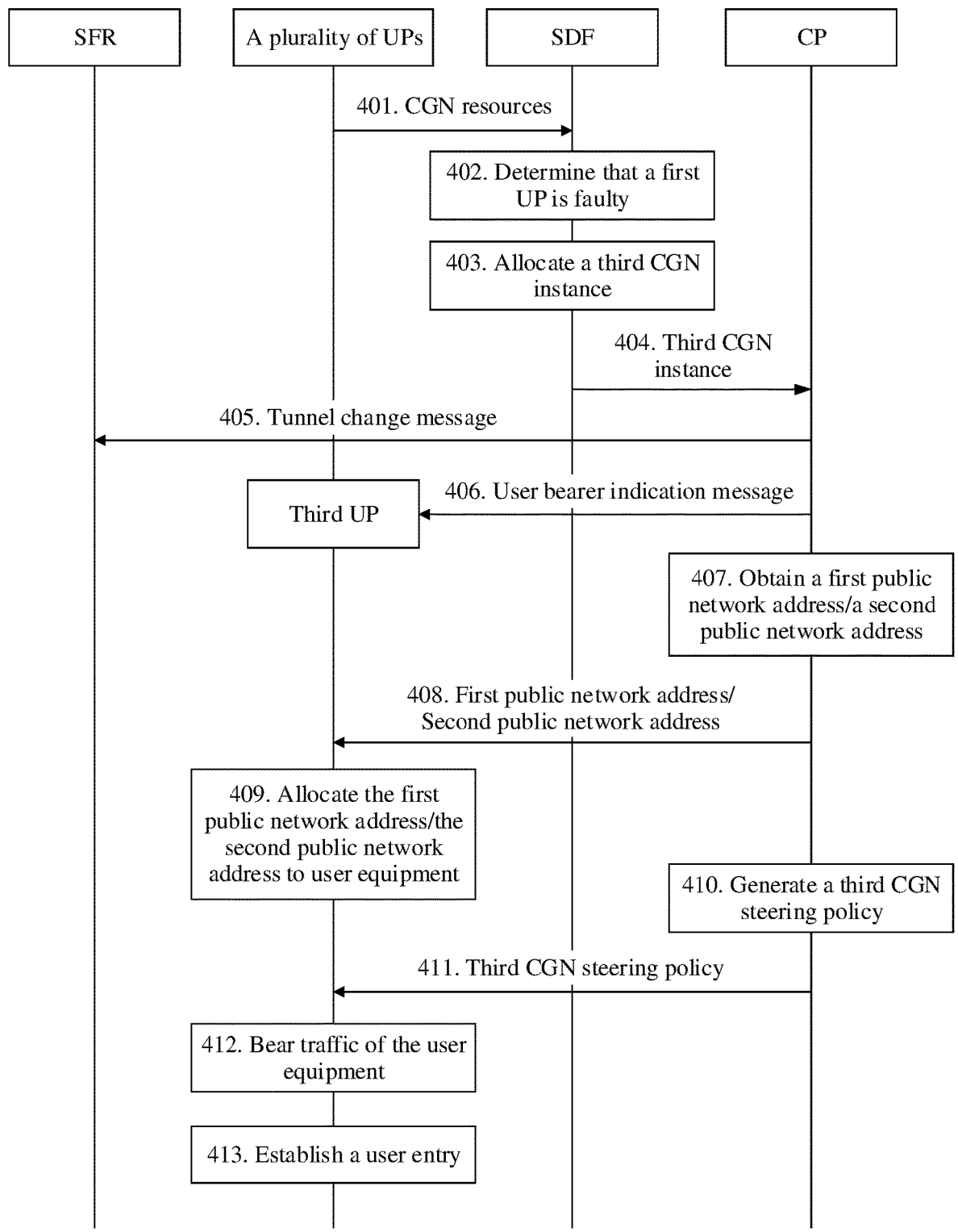
FIG. 4 is a schematic diagram of a network access control method according to an embodiment of this application.

Specifically, with reference to FIG. 4, this application provides a network access control method that includes the following steps.

401. A plurality of UPs report CGN resources to an SDF, so that the SDF obtains a CGN resource pool, where the CGN resources include a CGN service load status of each of the plurality of UPs.

Step 301 is the same as steps 201 and 301, and details are not described herein again.

402. The SDF determines that a first UP/a second UP is faulty.

In this embodiment of this application, the SDF may perceive whether a UP (the first UP/the second UP) accessed by user equipment is faulty. The first UP is used as an example. When the first UP is not in an offline state, the first UP continuously sends a status signal to the SDF, to notify the SDF of existence of the first UP. If the first UP does not go offline, and the SDF does not receive the status signal for a period of time, the SDF may determine that the first UP is faulty.

403. The SDF allocates a third CGN instance to the user equipment based on an SLA policy/a new SLA policy and the CGN resource pool. The third CGN instance indicates a third UP having an available CGN resource, and the third UP is one of the plurality of UPs.

In this embodiment of this application, after determining that the first UP is faulty, the SDF may allocate the third CGN instance to the user equipment based on the SLA policy/the new SLA policy and the CGN resource pool. A process thereof is similar to steps 204 and 303, and details are not described herein again. It should be noted that, in this embodiment of this application, the SDF allocates a CGN instance to the user equipment indicated in steps 204 and 303, and further allocates a third CGN instance to each user equipment served by the first UP/the second UP. In some possible implementations, the CGN instance allocated by the SDF to each user equipment served by the first UP/the second UP may indicate a same UP, or may indicate a different UP. This is not limited herein.

404. The SDF sends the third CGN instance to a CP.

Step 404 is similar to steps 205 and 304, and details are not described herein again.

405. The CP delivers a tunnel change message to an SFR, where the tunnel change message indicates the SFR to steer traffic of the user equipment to the third UP.

Step 405 is similar to steps 206 and 305, and details are not described herein again.

406. The CP sends a user bearer indication message to the third UP, where the user bearer indication message indicates to bear the traffic of the user equipment.

Step 406 is similar to steps 207 and 306, and details are not described herein again.

407. The CP obtains a first public network address/a second public network address used by the user equipment in the first UP/the second UP.

If a public network address is reallocated to the user equipment by the third UP, the third UP sends a source tracing log to a radius server. Because the first UP/the second UP serves a large quantity of user equipments, a large quantity of transmission overheads are caused, and even network congestion may be caused. Therefore, in this embodiment of this application, the CP may obtain the first public network address/the second public network address of the user equipment in the first UP/the second UP, so that the user equipment continues to use the first public network address/the second public network address.

408. The CP sends the first public network address/the second public network address to the third UP.

After the first public network address/the second public network address is obtained, the first public network address/the second public network address is sent to the third UP.

409. The third UP allocates the first public network address/the second public network address to the user equipment.

After the first public network address/the second public network address is obtained, the third UP may allocate the first public network address/the second public network address to the user equipment, so that the third UP does not need to allocate another public network address or upload the source tracing log. This reduces transmission overheads. In addition, if all user equipments in the first UP/the second UP are allocated to a same UP, namely, the third UP, public network addresses of the third UP may be insufficient. In this case, after the CP reclaims the first public network address/the second public network address used by the user equipment in the first UP/the second UP, in other words, reclaims all public network addresses of the first UP/the second UP and allocates the public network addresses to the third UP for use. This avoids a step in which the third UP applies to an ODAP server for more public network addresses.

410. The CP generates a third CGN steering policy based on the third CGN instance, where the third CGN steering policy indicates to steer the traffic of the user equipment to the third UP indicated by the third CGN instance.

Step 410 is similar to steps 211 and 311, and details are not described herein again.

411. The CP sends the third CGN steering policy to the third UP.

Step 411 is similar to steps 212 and 312, and details are not described herein again.

412. The third UP bears the traffic of the user equipment through a third CPU.

Step 412 is similar to steps 213 and 312, and details are not described herein again.

413. The second UP establishes a user entry for the user equipment.

Step 413 is similar to steps 214 and 314, and details are not described herein again.

Figure 5:
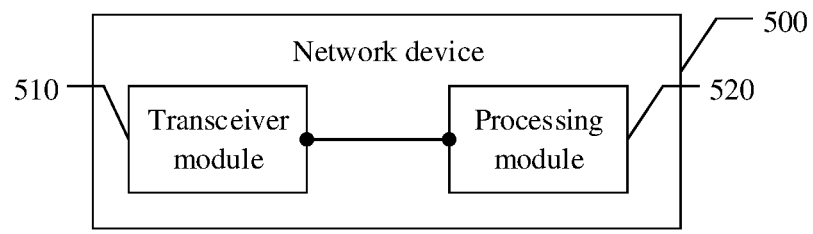
FIG. 5 is a schematic diagram of a network device according to an embodiment of this application.

With reference to FIG. 5, this application provides a network device 500. An SDF is disposed in the network device 500. The network device 500 includes a transceiver module 510 and a processing module 520.

The transceiver module 510 is configured to receive CGN resources reported by a plurality of UPs, to obtain a CGN resource pool, where the CGN resources include a CGN service load status of each of the plurality of UPs. The transceiver module 510 is further configured to receive a CGN instance obtaining request sent by a CP, where the CGN instance obtaining request indicates to allocate a CGN instance to user equipment. The processing module 520 is configured to allocate a first CGN instance to the user equipment based on the CGN resource pool, where the first CGN instance indicates a first UP having an available CGN resource, and the first UP is one of the plurality of UPs. The transceiver module 510 is further configured to send the first CGN instance to the CP. For a specific implementation, refer to detailed descriptions of steps 201 to 216 summarized in the embodiment shown in FIG. 2. Details are not described herein again.

In a specific implementation, the transceiver module 510 is further configured to receive a differentiated service-level agreement SLA policy configured by a remote authentication dial in user service radius server. The processing module 520 is specifically configured to allocate the first CGN instance to the user equipment based on the CGN resource pool and the SLA policy. For a specific implementation, refer to detailed descriptions of step 204 summarized in the embodiment shown in FIG. 2. Details are not described herein again.

In a specific implementation, the transceiver module 510 is further configured to receive a new SLA policy sent by the radius server. The processing module 520 is further configured to allocate a second CGN instance to the user equipment based on the new SLA policy and the CGN resource pool, where the second CGN instance indicates a second UP having an available CGN resource, and the second UP is one of the plurality of UPs. The transceiver module 510 is further configured to send the second CGN instance to the CP. For a specific implementation, refer to detailed descriptions of steps 301 to 316 summarized in the embodiment shown in FIG. 3. Details are not described herein again.

In a specific implementation, the processing module 520 is further configured to determine that the first UP is faulty. The processing module 520 is further configured to allocate a third CGN instance to the user equipment based on the SLA policy and the CGN resource pool, where the third CGN instance indicates a third UP having an available CGN resource, and the third UP is one of the plurality of UPs. The transceiver module 510 is further configured to send the third CGN instance to the CP. For a specific implementation, refer to detailed descriptions of steps 401 to 413 summarized in the embodiment shown in FIG. 4. Details are not described herein again.

The processing module 520 is further configured to determine that the second UP is faulty. The processing module 520 is further configured to allocate a third CGN instance to the user equipment based on the new SLA policy and the CGN resource pool, where the third CGN instance indicates a third UP having an available CGN resource, and the third UP is one of the plurality of UPs. The transceiver module 510 is further configured to send the third CGN instance to the CP. For a specific implementation, refer to detailed descriptions of steps 401 to 413 summarized in the embodiment shown in FIG. 4. Details are not described herein again.

Figure 6:
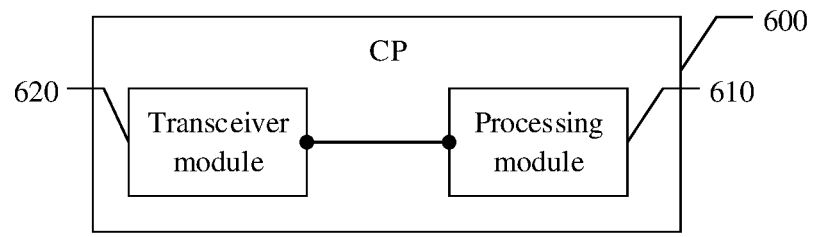
FIG. 6 is a schematic diagram of a CP according to an embodiment of this application.

With reference to FIG. 6, this application provides a CP 600, and the CP 600 includes a processing module 610 and a transceiver module 620.

The processing module 610 is configured to determine that user equipment goes online. The transceiver module 620 is configured to send a CGN instance obtaining request to an SDF, where the CGN instance obtaining request indicates to allocate a CGN instance to the user equipment. The transceiver module 620 is further configured to receive a first CGN instance sent by the SDF, where the first CGN instance indicates a first UP having an available CGN resource, and the first UP is one of a plurality of UPs. The processing module 610 is configured to generate a first CGN steering policy based on the first CGN instance, where the first CGN steering policy indicates to steer traffic of the user equipment to the first UP indicated by the first CGN instance. The transceiver module 620 is further configured to send the first CGN steering policy to the first UP. For a specific implementation, refer to detailed descriptions of steps 201 to 216 summarized in the embodiment shown in FIG. 2. Details are not described herein again.

In a specific implementation, the transceiver module 620 is further configured to send a user bearer indication message to the first UP, where the user bearer indication message indicates to bear the traffic of the user equipment. The transceiver module 620 is further configured to receive a first public network address sent by the first UP, where the first public network address is a public network address allocated to the user equipment. The transceiver module 620 is further configured to send a source tracing log to a radius server, where the source tracing log includes a private network address of the user equipment and the first public network address. For a specific implementation, refer to detailed descriptions of step 207 summarized in the embodiment shown in FIG. 2. Details are not described herein again.

In a specific implementation, the transceiver module 620 is further configured to receive a second CGN instance sent by the SDF, where the second CGN instance indicates a second UP having an available CGN resource, and the second UP is one of the plurality of UPs. The processing module 610 is further configured to generate a second CGN steering policy based on the second CGN instance, where the second CGN steering policy indicates to steer the traffic of the user equipment to the second UP. The transceiver module 620 is further configured to send the second CGN steering policy to the second UP. For a specific implementation, refer to detailed descriptions of steps 301 to 316 summarized in the embodiment shown in FIG. 3. Details are not described herein again.

In a specific implementation, the transceiver module 620 is further configured to send the user bearer indication message to the second UP, where the user bearer indication message indicates to bear the traffic of the user equipment. The transceiver module 620 is further configured to receive a second public network address sent by the second UP, where the second public network address is a public network address allocated to the user equipment by the second UP. The transceiver module 620 is further configured to send a source tracing log to the radius server, where the source tracing log includes the private network address of the user equipment and the second public network address. For a specific implementation, refer to detailed descriptions of step 310 summarized in the embodiment shown in FIG. 3. Details are not described herein again.

In a specific implementation, the transceiver module 620 is further configured to receive a third CGN instance sent by the SDF, where the third CGN instance indicates a third UP having an available CGN resource, and the third UP is one of the plurality of UPs. The processing module 610 is further configured to generate a third CGN steering policy based on the third CGN instance, where the third CGN steering policy indicates to steer the traffic of the user equipment to the third UP indicated by the third CGN instance. The transceiver module 620 is further configured to send the third CGN steering policy to the third UP. For a specific implementation, refer to detailed descriptions of steps 401 to 413 summarized in the embodiment shown in FIG. 4. Details are not described herein again.

In a specific implementation, the transceiver module 620 is further configured to obtain the first public network address of the user equipment in the first UP, and the transceiver module 620 is further configured to send the first public network address to the third UP, so that the third UP allocates the first public network address to the user equipment. For a specific implementation, refer to detailed descriptions of steps 407 to 409 summarized in the embodiment shown in FIG. 4. Details are not described herein again.

Figure 7:
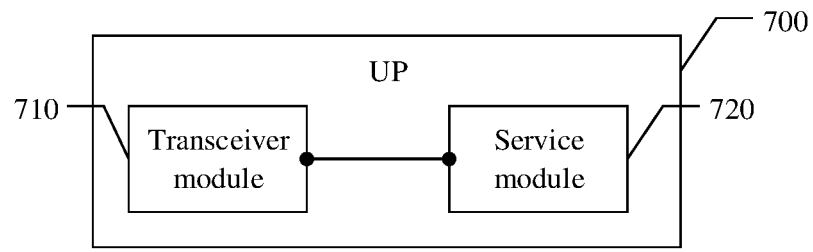
FIG. 7 is a schematic diagram of a UP according to an embodiment of this application.

With reference to FIG. 7, this application provides a UP 700, and the UP 700 includes a transceiver module 710 and a service module 720.

The transceiver module 710 is configured to report a CGN resource to an SDF, where the CGN resource includes a CGN service load status of a first UP, and the first UP is one of a plurality of UPs. The transceiver module 710 is further configured to receive a first CGN steering policy sent by a CP, where the first CGN steering policy includes a first CGN instance, the first CGN instance indicates the first UP having an available CGN resource, and the first UP is one of the plurality of UPs. The service module 720 is configured to bear traffic of user equipment. For a specific implementation, refer to detailed descriptions of steps 201 to 216 summarized in the embodiment shown in FIG. 2. Details are not described herein again.

In a specific implementation, the transceiver module 710 is further configured to receive a user bearer indication message sent by the CP, where the user bearer indication message indicates to bear the traffic of the user equipment. The service module 720 is configured to allocate a first public network address to the user equipment. The transceiver module 710 is further configured to send the first public network address to the CP. For a specific implementation, refer to detailed descriptions of step 207 summarized in the embodiment shown in FIG. 2. Details are not described herein again.

In a specific implementation, the transceiver module 710 is further configured to receive a second public network address sent by the CP. The service module 720 is configured to allocate the second public network address to the user equipment. For a specific implementation, refer to detailed descriptions of steps 308 and 309 summarized in the embodiment shown in FIG. 3. Details are not described herein again.

Figure 8:
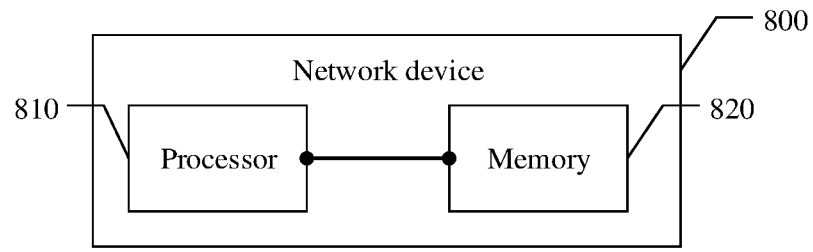
FIG. 8 is a schematic diagram of a network device according to an embodiment of this application.

With reference to FIG. 8, this application further provides a network device 800, including a processor 810 and a memory 820. The processor 810 is coupled to the memory 820. The memory 820 is configured to store a program, and the processor 810 is configured to execute the program in the memory 820, so that the network device 800 performs steps in the methods in the foregoing steps 201 to 216, steps 301 to 316, and steps 401 to 413.

When the network device is an SDF, the processor 810 is configured to receive CGN resources reported by a plurality of UPs, to obtain a CGN resource pool, where the CGN resources include a CGN service load status of each of the plurality of UPs, receive a CGN instance obtaining request sent by the CP, where the CGN instance obtaining request indicates to allocate a CGN instance to user equipment, allocate a first CGN instance to the user equipment based on the CGN resource pool, where the first CGN instance indicates a first UP having an available CGN resource, and the first UP is one of the plurality of UPs, and send the first CGN instance to the CP.

For a specific implementation, refer to detailed descriptions of steps 201 to 216 summarized in the embodiment shown in FIG. 2, or detailed descriptions of steps 301 to 316 summarized in the embodiment shown in FIG. 3, or detailed descriptions of steps 401 to 413 summarized in the embodiment shown in FIG. 4. Details are not described herein again.

When the network device is a CP, the processor 810 is configured to determine that user equipment goes online, send a CGN instance obtaining request to an SDF, where the CGN instance obtaining request indicates to allocate a CGN instance to the user equipment, receive a first CGN instance sent by the SDF, where the first CGN instance indicates a first UP having an available CGN resource, and the first UP is one of a plurality of UPs, generate a first CGN steering policy based on the first CGN instance, where the first CGN steering policy indicates to steer traffic of the user equipment to the first UP indicated by the first CGN instance, and send the first CGN steering policy to the first UP.

For a specific implementation, refer to detailed descriptions of steps 201 to 216 summarized in the embodiment shown in FIG. 2, or detailed descriptions of steps 301 to 316 summarized in the embodiment shown in FIG. 3, or detailed descriptions of steps 401 to 413 summarized in the embodiment shown in FIG. 4. Details are not described herein again.

When the network device is a UP, the processor 810 is configured to report a CGN resource to an SDF, where the CGN resource includes a CGN service load status of a first UP, and the first UP is one of a plurality of UPs, receive a first CGN steering policy sent by a CP, where the first CGN steering policy includes a first CGN instance, the first CGN instance indicates the first UP having an available CGN resource, and the first UP is one of the plurality of UPs, and bear traffic of user equipment.

For a specific implementation, refer to detailed descriptions of steps 201 to 216 summarized in the embodiment shown in FIG. 2, or detailed descriptions of steps 301 to 316 summarized in the embodiment shown in FIG. 3, or detailed descriptions of steps 401 to 413 summarized in the embodiment shown in FIG. 4. Details are not described herein again.

When modules in the embodiment shown in FIG. 8 are software modules, the software modules are stored in the memory 820, and when the processor 810 reads software code in the memory 820, the network device 800 is enabled to receive CGN resources reported by a plurality of UPs, to obtain a CGN resource pool, where the CGN resources include a CGN service load status of each of the plurality of UPs, receive a CGN instance obtaining request sent by the CP, where the CGN instance obtaining request indicates to allocate a CGN instance to user equipment, allocate a first CGN instance to the user equipment based on the CGN resource pool, where the first CGN instance indicates a first UP having an available CGN resource, and the first UP is one of the plurality of UPs, and send the first CGN instance to the CP, or determine that user equipment goes online, send a CGN instance obtaining request to an SDF, where the CGN instance obtaining request indicates to allocate a CGN instance to the user equipment, receive a first CGN instance sent by the SDF, where the first CGN instance indicates a first UP having an available CGN resource, and the first UP is one of a plurality of UPs, generate a first CGN steering policy based on the first CGN instance, where the first CGN steering policy indicates to steer traffic of the user equipment to the first UP indicated by the first CGN instance, and send the first CGN steering policy to the first UP, or report a CGN resource to an SDF, where the CGN resource includes a CGN service load status of a first UP, and the first UP is one of a plurality of UPs, receive a first CGN steering policy sent by a CP, where the first CGN steering policy includes a first CGN instance, the first CGN instance indicates the first UP having an available CGN resource, and the first UP is one of the plurality of UPs, and bear traffic of user equipment.

For a specific implementation, refer to detailed descriptions of steps 201 to 216 summarized in the embodiment shown in FIG. 2, or detailed descriptions of steps 301 to 316 summarized in the embodiment shown in FIG. 3, or detailed descriptions of steps 401 to 413 summarized in the embodiment shown in FIG. 4. Details are not described herein again.

An embodiment of this application further provides a computer program product. When the computer program product runs on a computer, the computer is enabled to perform steps in the methods in the foregoing steps 201 to 216, steps 301 to 316, and steps 401 to 413.

An embodiment of this application further provides a computer-readable storage medium. The computer-readable storage medium stores a program used for signal processing. When the program is run on a computer, the computer is enabled to perform steps in the methods in the foregoing steps 201 to 216, steps 301 to 316, and steps 401 to 413.

In addition, it should be noted that the described apparatus embodiment is merely an example. The units described as separate parts may or may not be physically separate, and parts displayed as units may or may not be physical units, may be located in one place, or may be distributed on a plurality of network units. Some or all the modules may be selected based on actual needs to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or certainly, by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to implement a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to a current technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a training device, a network device, or the like) to perform the methods described in embodiments of this application.

All or a part of the foregoing embodiments may be implemented by software, hardware, firmware, or any combination thereof. When software is used to implement embodiments, all or a part of embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A network device, applied to a steering decision function (SDF) in a network system, comprising:
   at least one processor;
   one or more non-transitory memories coupled to the at least one processor and storing programming instructions for execution by the at least one processor, the programming instructions including instructions to:
   obtain a carrier-grade network address translation (CGN) resource pool by receiving CGN resources reported by a plurality of user planes (UPs), wherein the network system comprises the SDF, the plurality of UPs, and a control plane (CP), wherein the CGN resources comprise a CGN service load status of each of the plurality of UPs, and the CGN service load status reflects a capability of each of the plurality of UPs for a CGN service;
   receive a CGN instance obtaining request sent by the CP, wherein the CGN instance obtaining request indicates to allocate a CGN instance to a user equipment;
   allocate a first CGN instance to the user equipment based on the CGN resource pool, wherein the first CGN instance indicates a first UP having an available CGN resource, and wherein the first UP is a UP of the plurality of UPs; and
   send the first CGN instance to the CP.

2. The network device according to claim 1, wherein the programming instructions further include instructions to:
   receive a service-level agreement (SLA) policy configured by a remote authentication dial in user service (RADIUS) server; and
   allocate the first CGN instance to the user equipment based on the CGN resource pool and the SLA policy.

3. The network device according to claim 2, wherein the programming instructions further include instructions to:
   receive a new SLA policy sent by the RADIUS server;
   allocate a second CGN instance to the user equipment based on the new SLA policy and the CGN resource pool, wherein the second CGN instance indicates a second UP having an available CGN resource, and wherein the second UP is one of the plurality of UPs; and
   send the second CGN instance to the CP.

4. The network device according to claim 3, wherein the programming instructions further include instructions to:
   determine that the second UP is faulty;
   allocate a third CGN instance to the user equipment based on the new SLA policy and the CGN resource pool, wherein the third CGN instance indicates a third UP having an available CGN resource, and wherein the third UP is one of the plurality of UPs; and
   send the third CGN instance to the CP.

5. The network device according to claim 2, wherein the programming instructions further include instructions to:
   determine that the first UP is faulty;

allocate a third CGN instance to the user equipment based on the SLA policy and the CGN resource pool, wherein the third CGN instance indicates a third UP having an available CGN resource, and wherein the third UP is one of the plurality of UPs; and send the third CGN instance to the CP.

6. The network device according to claim 1, wherein the first CGN instance comprises the first UP, a first CGN board in the first UP, and a first central processing unit (CPU) in the first CGN board.

7. A network device applied to a first user plane (UP) of a plurality of UPs in a network system, the network device comprising:
at least one processor;
one or more memories coupled to the at least one processor and storing programming instructions for execution by the at least one processor, the programming instructions including instructions to:
report a carrier-grade network address translation (CGN) resource to a steering decision function (SDF), wherein the CGN resource comprises a CGN service load status of the first UP, wherein the CGN service load status reflects a capability of the first UP for a CGN service, wherein the network system comprises the SDF, the plurality of UPs, and a control plane (CP), and wherein the first UP is one of the plurality of UPs;
receive a first CGN steering policy sent by the CP, wherein the first CGN steering policy comprises a first CGN instance, and wherein the first CGN instance indicates the first UP having an available CGN resource; and
bear traffic of a user equipment.

8. The network device according to claim 7, wherein the programming instructions further include instructions to:
receive a user bearer indication message sent by the CP, wherein the user bearer indication message indicates to bear the traffic of the user equipment;
allocate a first public network address to the user equipment; and
send the first public network address to the CP.

9. The network device of claim 8, wherein the instructions to bear the traffic of the user equipment include instructions to bear the traffic of the user equipment by translating a private network address of the user equipment into the first public network address.

10. The network device according to claim 7, wherein the programming instructions further include instructions to:
receive a second public network address sent by the CP; and
allocate the second public network address to the user equipment.

11. The network device of claim 7, wherein the instructions to bear the traffic of the user equipment include instructions to bear the traffic of the user equipment according to the first CGN steering policy.

12. The network device of claim 7, wherein the instructions further include instructions to report, after bearing the traffic of the user equipment and a load status is changed, a new CGN resource to the SDF.

13. A network system, comprising:
a steering decision function (SDF);
a plurality of user planes (UPs); and
a control plane (CP);
wherein the plurality of UPs are configured to report CGN resources to the SDF, wherein the SDF obtains a CGN resource pool according to the reported CGN resources, wherein the CGN resources comprise a CGN service load status of each UP of the plurality of UPs, and the CGN service load status reflects a capability of each of the plurality of UPs for a CGN service;
wherein the CP is configured to send a CGN instance obtaining request to the SDF, wherein the CGN instance obtaining request indicates to allocate a CGN instance to user equipment;
wherein the SDF is configured to allocate a first CGN instance to the user equipment based on the CGN resource pool, wherein the first CGN instance indicates a first UP having an available CGN resource, and wherein the first UP is one of the plurality of UPs, and wherein the SDF is further configured to send the first CGN instance to the CP;
wherein the CP is further configured to generate a first CGN steering policy based on the first CGN instance, wherein the first CGN steering policy indicates to steer traffic of the user equipment to the first UP indicated by the first CGN instance, and wherein the CP is further configured to send the first CGN steering policy to the first UP; and
wherein the first UP is configured to bear the traffic of the user equipment.

14. The network system according to claim 13, wherein the SDF is further configured to:
receive a service-level agreement (SLA) policy configured by a remote authentication dial in user service (RADIUS) server; and
allocate the first CGN instance to the user equipment based on the CGN resource pool and the SLA policy.

15. The network system according to claim 14, wherein the SDF is further configured to:
receive a new SLA policy sent by the RADIUS server;
allocate a second CGN instance to the user equipment based on the new SLA policy and the CGN resource pool, wherein the second CGN instance indicates a second UP having an available CGN resource, and wherein the second UP is one of the plurality of UPs; and
send the second CGN instance to the CP.

16. The network system according to claim 15, wherein the SDF is further configured to:
determine that the second UP is faulty;
allocate a third CGN instance to the user equipment based on the new SLA policy and the CGN resource pool, wherein the third CGN instance indicates a third UP having an available CGN resource, and wherein the third UP is one of the plurality of UPs; and
send the third CGN instance to the CP.

17. The network system according to claim 14, wherein the SDF is further configured to:
determine that the first UP is faulty;
allocate a third CGN instance to the user equipment based on the SLA policy and the CGN resource pool, wherein the third CGN instance indicates a third UP having an available CGN resource, and wherein the third UP is one of the plurality of UPs; and
send the third CGN instance to the CP.

18. The network system according to claim 13, wherein the first CGN instance comprises the first UP, a first CGN board in the first UP, and a first central processing unit (CPU) in the first CGN board.

19. The network system of claim 13, wherein the first UP being configured to bear the traffic of the user equipment comprises the first UP being configured to bear the traffic of the user equipment according to the first CGN steering policy.

20. The network system of claim 13, wherein the first UP is further configured to report, after bearing the traffic of the user equipment and a load status is changed, a new CGN resource to the SDF.

* * * * *